United States Patent [19]

Bradbury

[11] 4,223,753
[45] Sep. 23, 1980

[54] OMNI-DIRECTIONAL TRANSPORT DEVICE

[76] Inventor: Harold M. Bradbury, 1001 Ten St., Woodward, Okla. 73801

[21] Appl. No.: 862,032

[22] Filed: Dec. 19, 1977

[51] Int. Cl.$^2$ .................... B62D 11/00; B62D 57/00; B62D 61/06
[52] U.S. Cl. .................................. 180/6.2; 180/7 R; 180/9.2 R; 180/21; 180/210; 301/5 P; 280/104
[58] Field of Search ............... 180/6.2 R, 7 R, 21; 301/5 P, 5 R; 280/104; 193/35 MD

[56] References Cited

U.S. PATENT DOCUMENTS

| 867,513 | 10/1907 | Kennedy-McGregor | 180/7 P X |
| 1,305,535 | 6/1919 | Grabowiecki | 301/5 P |
| 2,448,222 | 8/1948 | Jones | 301/5 R |
| 3,292,943 | 12/1966 | Crockett | 280/104 |
| 3,465,843 | 9/1969 | Guinot | 301/5 P X |
| 3,679,043 | 7/1972 | Becker | 193/35 MD |
| 3,789,947 | 2/1974 | Blumrich | 301/5 P X |
| 3,882,885 | 5/1975 | McCain | 301/5 P X |
| 4,018,322 | 4/1977 | Brown | 193/35 MD |

FOREIGN PATENT DOCUMENTS 822660   7/1949   Fed. Rep. of Germany.

Primary Examiner—John P. Silverstrim
Attorney, Agent, or Firm—Laney, Dougherty, Hessin & Beavers

[57] ABSTRACT

An apparatus for producing or measuring omni-directional motion of the apparatus upon a relatively smooth but not necessarily planar surface and/or for producing or measuring omni-directional movement of the surface relative to the apparatus. The transport device includes a frame and at least two wheels having peripheral rollers. The wheels rotate about non-parallel axes. Any desired movement of the device relative to a given surface can be achieved by appropriate rotational inputs to the wheels. Movement of the device in all directions can be achieved without incurring significant sliding of the device relative to the surface. This relatively slip-free motion is achieved by means of the peripheral rollers which allow a given wheel to be moved in a direction parallel to its axis of rotation without sliding. In this manner motions of the device upon the surface are essentially completely reversible by merely applying a rotational input to the wheels opposite of the initial rotational input. Also, by the use of the independent drive motors on each wheel, the omni-directional transport device can execute any rotational movement about its central axis or any other axis perpendicular to the surface with respect to which the device moves. Additionally, rotational measurement sensors can be placed upon each wheel thereby providing means for measuring the movement of the device relative to a surface in contact with the rollers or the movement of such surface relative to the device.

9 Claims, 19 Drawing Figures

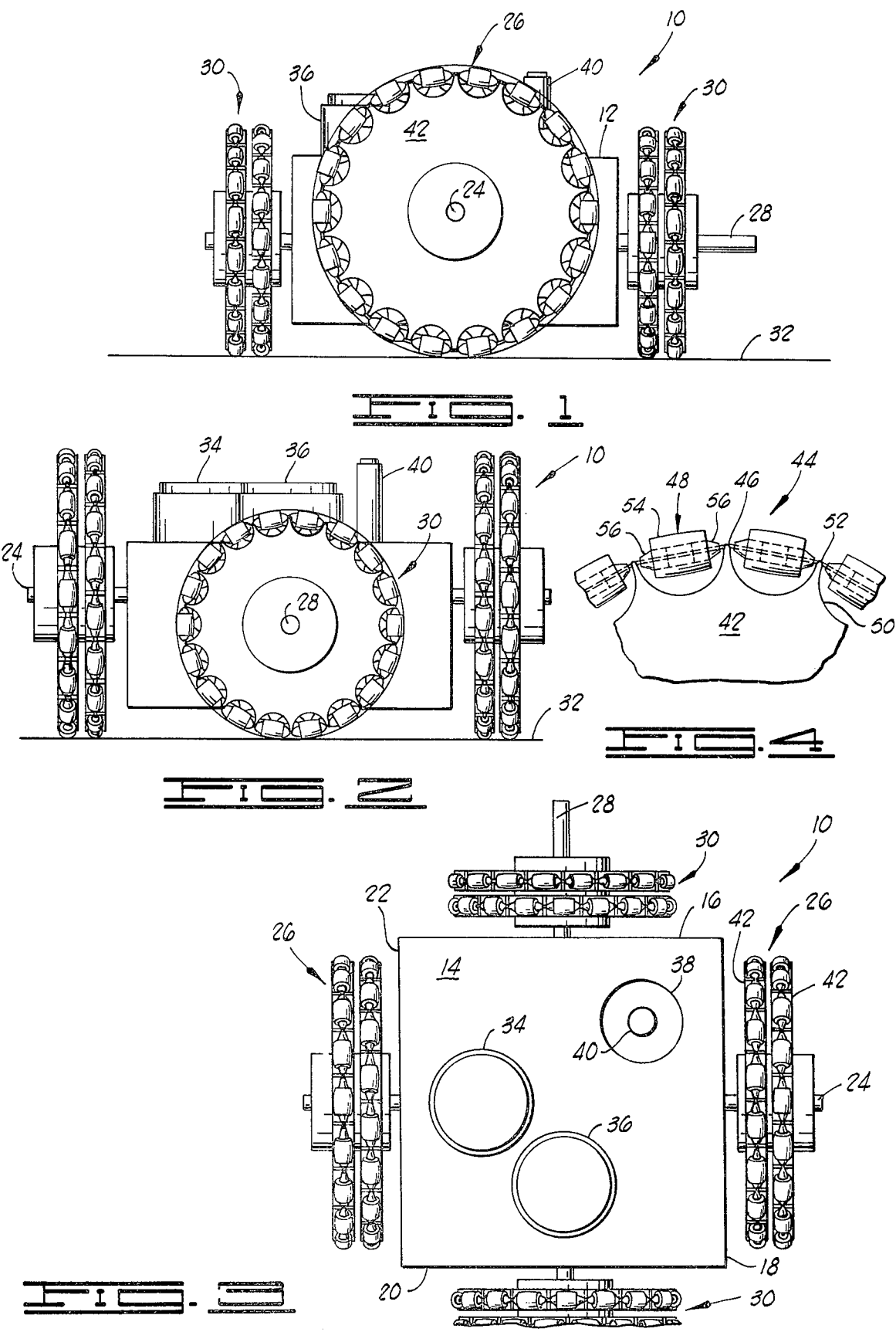

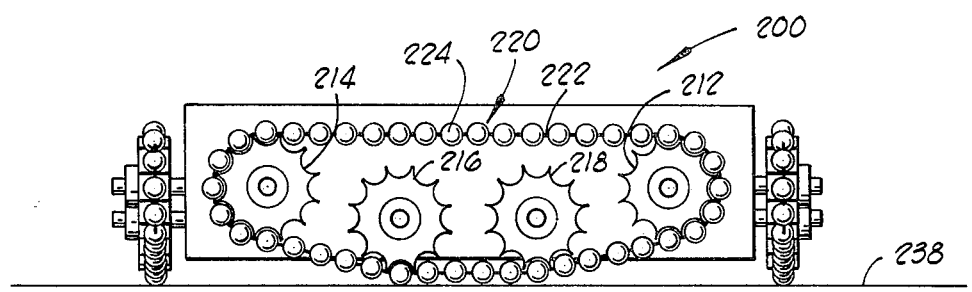
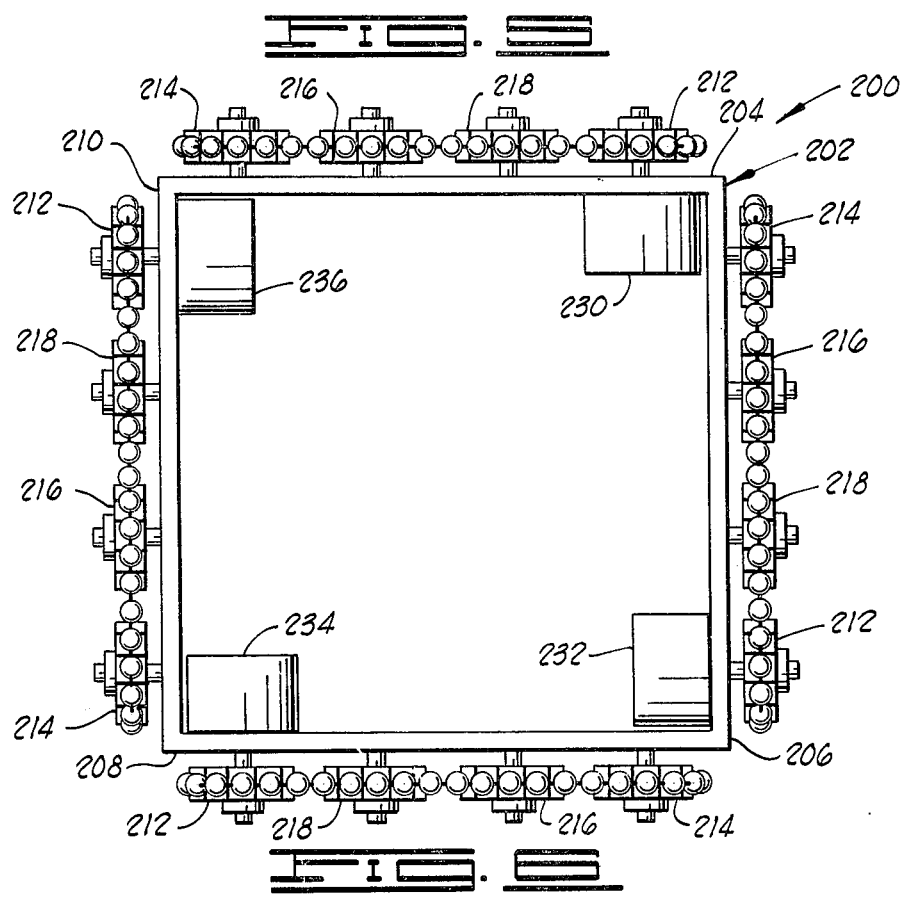
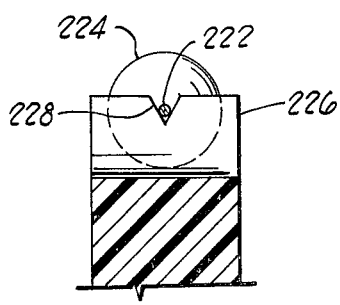

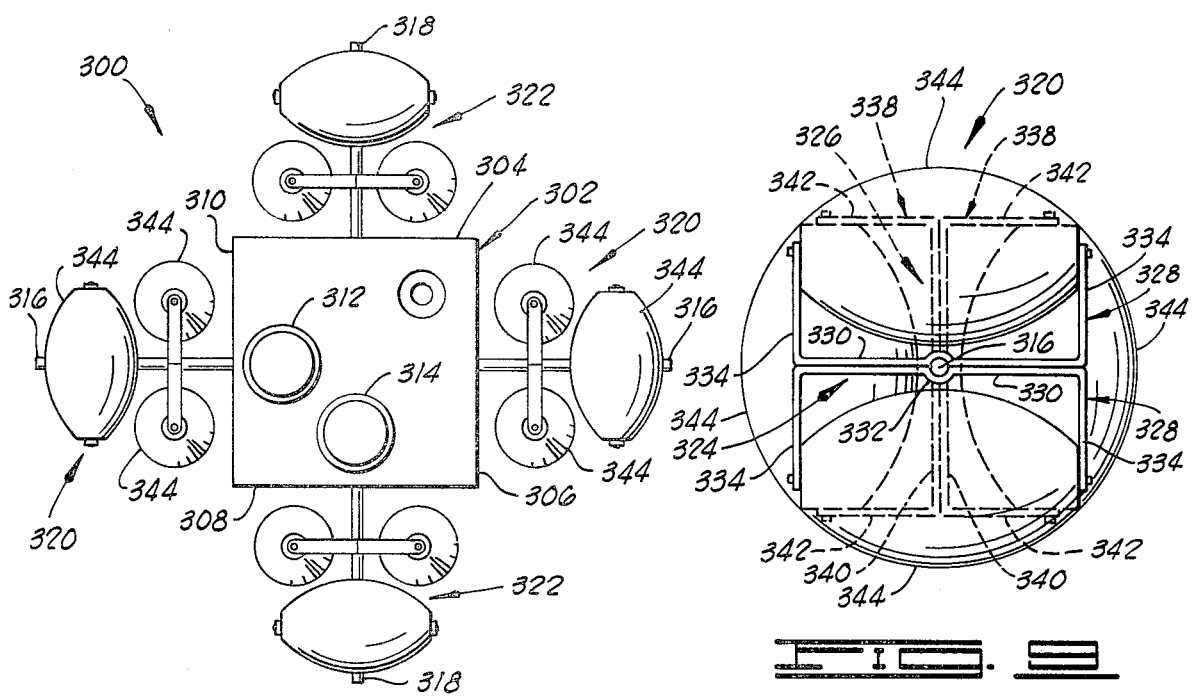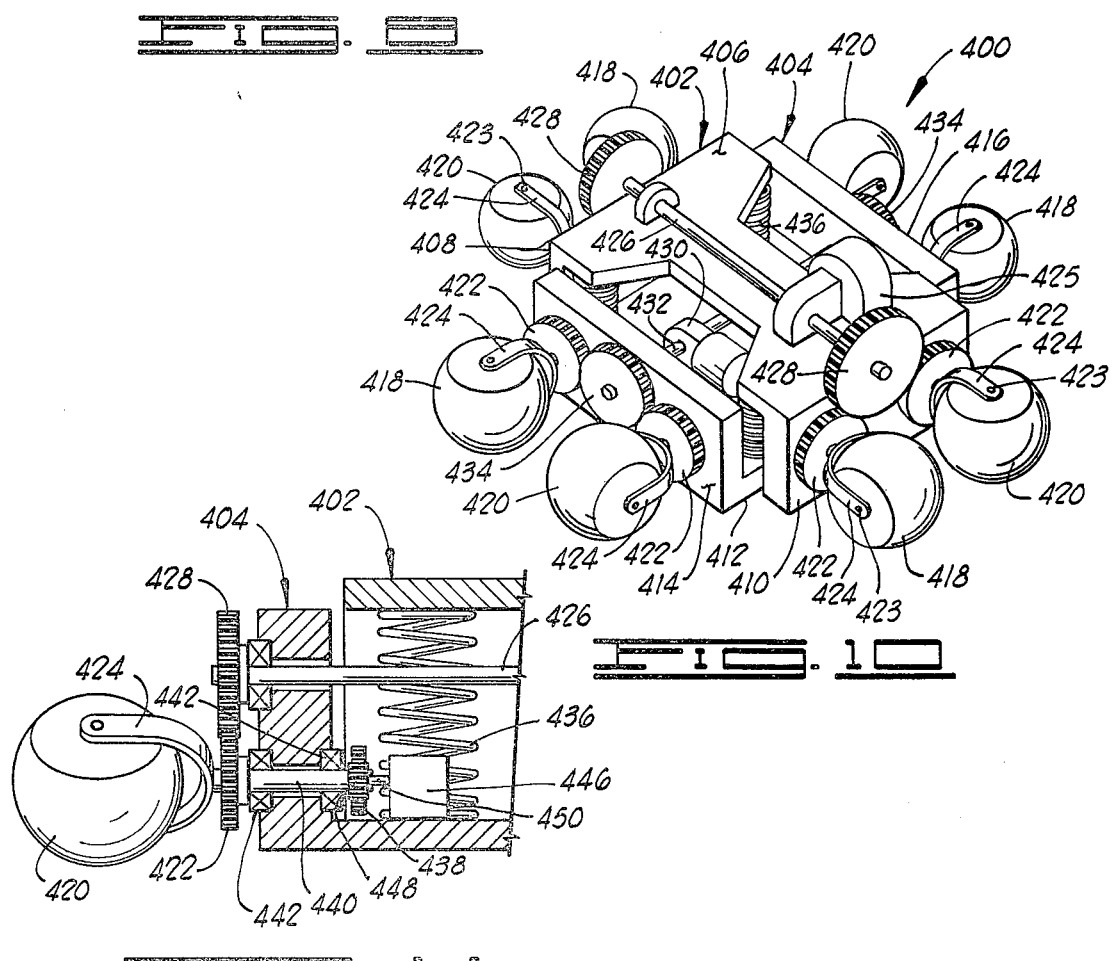

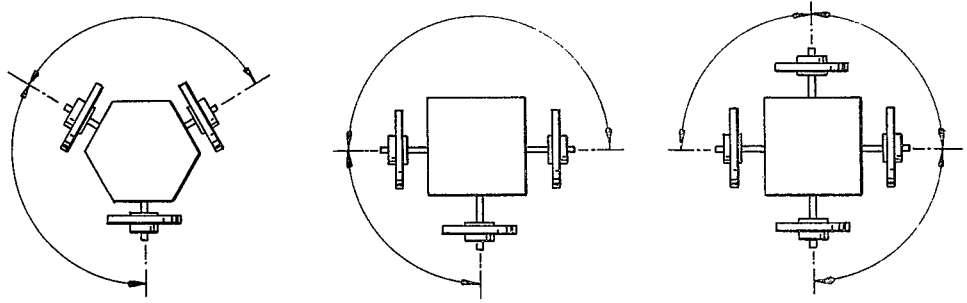
FIG.12A  FIG.12B  FIG.12C
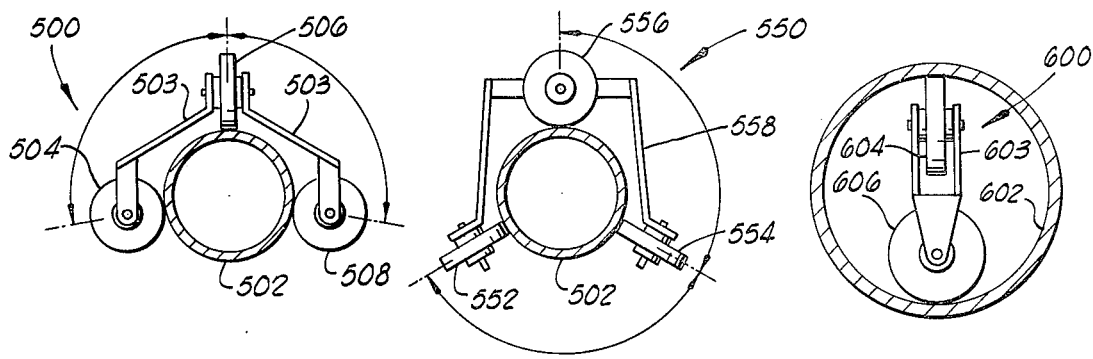
FIG.13A  FIG.13B  FIG.13C
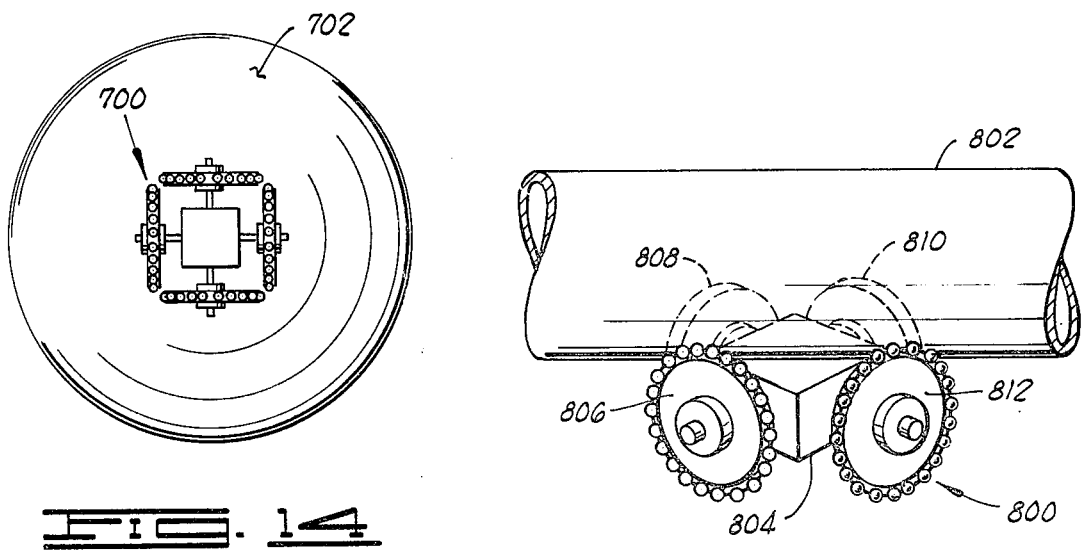
FIG.14
FIG.15

OMNI-DIRECTIONAL TRANSPORT DEVICE

BACKGROUND OF THE INVENTION

1. Field of the Invention

This invention relates generally to apparatus for producing omni-directional movement relative to a surface, and more particularly, but not by way of limitation, to apparatus for producing and/or measuring omni-directional movement of a device relative to a relatively smooth but not necessarily planar surface and/or omni-directional movement of such a surface relative to such a device, without incurring any significant sliding movement between the apparatus and the surface.

2. Description of the Prior Art (Prior Art Statement)

The following statement is intended to be a Prior Art Statement in compliance with the guidance and requirements of 37 CFR Sections 1.56, 1.97 and 1.98 and with Section 609 of the Manual of Patent Examining Procedure.

The most relevant prior art references known to Applicant include U.S. Pat. No. 3,789,947 issued to Blumrich; U.S. Pat. No. 3,882,885 issued to McCain, and German Pat. No. 822,660 issued to Fuchs. Each of these references is relevant in that it shows a wheel with peripheral rollers.

Additionally, McCain is relevant in that it shows at FIGS. 5 and 6 a device having dual wheels with peripheral rollers, the rollers of said dual wheels being staggered relative to each other so as to provide for constant contact of at least one peripheral roller of one of the wheels with a supporting surface at all times.

A further relevant reference is that of U.S. Pat. No. 3,465,843 issued to Guinot. Guinot is relevant in that it shows a wheel-like steering device having peripheral rollers. The steering device of Guinot rotates about an axis transverse to the axis of rotation of the conventional drive wheels which are also included in the Guinot apparatus.

There has long been a need for a device which can achieve non-linear movement across a surface without incurring friction causing slippage or skewing of the driving apparatus upon the surface. Furthermore, the prior art shows that there has long been a need for a device which can achieve omni-directional movement by means other than the inclination of a pair of wheels relative to the direction of movement of the device, such as is found in the steering mechanism of a conventional automobile.

Blumrich attempted to achieve both of these ends by use of a driven wheel having driven peripheral rollers mounted thereon. In this manner, transport of the carried device in a direction perpendicular to the axis of the wheel is achieved by rotation of the wheel itself, and transport of the device in a direction parallel to the axis of the wheel is achieved by powered rotation of the peripheral rollers. This requires complex power and control apparatus for driving the peripheral rollers.

McCain achieves non-linear motion of his transport device by means of a guide track which restricts the line of motion of the device. The peripheral rollers of the wheel of the McCain apparatus are provided only to lessen friction induced by motion of the apparatus in a direction parallel to the axis of rotation of the wheels.

It is seen then, that none of the cited references show or suggest the combination of the present invention comprising two wheels having peripheral rollers, said wheels rotating about non-parallel axes.

SUMMARY OF THE INVENTION

An apparatus is provided for producing or measuring omni-directional motion of the apparatus relative to a relatively smooth but not necessarily planar surface in contact with rotative portions of the apparatus. The transport device includes a frame and at least two wheels having peripheral rollers, said wheels rotating about non-parallel axes. Any desired movement of the device relative to a given surface in contact with the rollers can be achieved by appropriate rotational inputs to the wheels. Movement of the device in all directions can be achieved without incurring any substantial sliding motion of the device relative to the surface. This relative frictionless motion is achieved by means of the peripheral rollers which allow a given wheel to be moved in a direction parallel to its axis of rotation without sliding. In this manner motions of the device upon the surface are completely reversible by merely applying a rotational input to the wheels opposite of the initial rotational input. Also, by the use of independent drive motors on each wheel, the omni-directional transport device can execute any rotational movement about its central axis, or any other axis, perpendicular to the contacting surface, and pivotal movement about any point on the surface. Additionally, rotational measurement sensors can be placed upon each axle, thereby providing means for measuring the movement of the device relative to the surface. All of these actions are achieved without the need for any power input to the peripheral rollers.

It is, therefore, a general object of the present invention to provide an omni-directional transport device.

A further object of the present invention is to provide a means for achieving omni-directional motion of an apparatus relative to a surface without incurring any significant sliding motion of the transport device relative to the surface.

Another object of the present invention is to provide means for measuring the relative movement of a device with respect to a surface.

Yet another object of the present invention is to provide a means for producing omni-directional movement of a surface relative to a pair of non-parallel wheels having peripheral rollers.

Another object of the present invention is the provision of apparatus for measuring the movement of a surface relative to a pair of non-parallel wheels having peripheral rollers.

Yet another object of the present invention is to provide a track-like driving device having a track traveling upon a pair of sprockets, said track having peripheral rollers.

An additional object of the present invention is to provide an improved dual wheel having peripheral rollers.

Another object of the present invention is the provision of an omni-directional transport device having truncated spherical roller drive assemblies.

A further object of the present invention is the provision of an omni-directional transport device having a flexible frame so that it may traverse irregular surfaces without causing the driving wheels to lose contact with the surface being traversed.

Yet another object of the present invention is to provide an omni-directional transport device for movement upon the outer surface of a cylinder.

A further object of the present invention is the provision of an omni-directional transport device for movement along an inner surface of a hollow cylindrical body.

Another object of the present invention is the provision of a novel idler member between two relatively moving spherical surfaces.

A further object of the present invention is the provision of an omni-directional transport device for producing and/or measuring movement of the device relative to a spherical surface.

Another object of the present invention is to provide an improved apparatus for omni-directional movement of a cylindrical object, such as a pipe.

Other and further objects, features and advantages of the present invention will be readily apparent to those skilled in the art upon a reading of the description of preferred embodiments which follows, when taken in conjunction with the accompanying drawings.

BRIEF DESCRIPTION OF THE DRAWINGS

FIG. 1 is a side elevational view of a preferred embodiment of the present invention having two pairs of dual wheels, each pair of dual wheels being mounted upon an axis transverse to the other pair of dual wheels.

FIG. 2 is a side elevational view of the apparatus of FIG. 1 rotated within a horizontal plane through an angle of 90° from that shown in FIG. 1.

FIG. 3 is a top view of the apparatus shown in FIG. 2.

FIG. 4 is a detail view of an edge of one of the single wheel elements of the apparatus of FIG. 1, showing details of construction of the peripheral rollers.

FIG. 5 is a side elevational view of a second preferred embodiment of the present invention, having four driven tracks, each track mounted adjacent a side of a rectangular frame, and each track including peripheral rollers.

FIG. 6 is a top view of the apparatus of FIG. 5.

FIG. 7 is a detail sectional view of the track of the apparatus of FIG. 5 as it is engaged by a driving sprocket.

FIG. 8 is a top view of a third preferred embodiment of the present invention similar to that of FIG. 1, but having two pairs of dual wheels, each single wheel element being comprised of only two peripheral rollers.

FIG. 9 is a side elevational view of one of the dual wheels of the apparatus of FIG. 8.

FIG. 10 is an oblique view of a fourth preferred embodiment of the present invention having four pairs of truncated spherical roller driving mechanisms, each pair of truncated spherical roller driving mechanisms being located adjacent one side of a rectangular frame.

FIG. 11 is a partly sectional elevational view of the apparatus of FIG. 10, showing a truncated spherical roller assembly, the driving mechanism, the motion measurement mechanism, and inner detals of the flexible frame of the apparatus.

FIGS. 12A through C are top plan views of the general apparatus of the present invention showing three possible orientations of non-parallel wheels having peripheral rollers, relative to the device to be driven. The orientations shown in FIGS. 12A–C can be used with any of the specific embodiments of wheels with peripheral rollers or with the truncated spherical roller assemblies shown previously.

FIGS. 13A and 13B show two variations of a fifth preferred embodiment of the present invention, providing an apparatus for omni-directional transport upon the outer surface of a cylindrical object.

FIG. 13C shows a sixth preferred embodiment of the present invention, which provides means for achieving omni-directional movement along the inner cylindrical surface of a hollow cylinder such as a pipe.

FIG. 14 shows a seventh preferred embodiment of the present invention which provides means for achieving omni-directional movement upon the outer surface of a sphere, and which also provides a transmission mechanism for transfer of rotational motion between a spherical surface and a second surface.

FIG. 15 shows an eighth preferred embodiment of the present invention suitable for achieving omni-directional movement of a cylindrical object relative to a fixed driving device.

DETAILED DESCRIPTION OF THE PREFERRED EMBODIMENTS OF THE INVENTION

Referring now to the drawings and particularly to FIG. 1, the first preferred embodiment of the omni-directional transport device of the present invention is illustrated and generally designated by the numeral 10. The transport device 10 includes a rectangular parallel piped frame 12. As is best shown in FIG. 3, the frame 12 includes a top 14 and sides 16, 18, 20, and 22. An axle 24 is rotatably mounted within the sides 18 and 22 and perpendicular thereto. Upon either end of the axle 24 is mounted a large dual wheel generally designated by the numeral 26. Rotatably mounted within and perpendicular to the sides 16 and 20 is a second axle 28 which is transverse to the first axle 24. Mounted upon either end of the axle 28 is a small dual wheel generally designated by the numeral 30.

The dual wheels 26 and 30 are of similar construction and differ only in that the large dual wheels 26 are of greater diameter than the small dual wheels 30. It will be noted that this difference in diameter of the large dual wheels 26 as compared to the small dual wheels 30 causes the axle 24 to be located a greater distance above a surface 32 upon which the transport device 10 moves than is the axle 28 of the small dual wheels 30. This permits both the axle 24 and the axle 28 to solidly connect their respective pairs of dual wheels. If all four dual wheels were of the same height, the axles 24 and 28 would interfere at their point of intersection. As will be described below, it is preferable to have this difference in wheels sizes only when it is desired to drive each pair of wheels by a single solid axle. If, however, each wheel is provided with a separate drive source, then all the wheels can be of the same height, because the axles need not cross one another.

Attached to the frame 12 is a first drive motor 34 which drives the axle 24 by conventional gearing means (not shown). Also attached to the frame 12 is a second drive motor 36 which drives the axle 28 by means of conventional gearing (not shown).

Also located within the frame 12 is an aperture 38 which describes a circular cross-section as seen from above in FIG. 3. Carried within the aperture 38 is an instrument 40.

Each of the large dual wheels 26 is comprised of a pair of staggered or circumferentially offset sprockets 42. Each of the sprockets 42 is circumscribed by an endless chain generally designated by the numeral 44. The combination of the sprocket 42 and the endless chain 44 is referred to as a single wheel element. The endless chain 44 is comprised of an endless wire 46 upon which is mounted a plurality of rollers 48. It will be appreciated that the wire 46 can be replaced by any endless flexible member and need not be a metal wire. Furthermore, the endless flexible member could be replaced by a series of bearing mounts for the rollers 48 between adjacent teeth 50 of the sprocket 42.

The sprocket 42 has a plurality of teeth 50. The sprockets 42 of the wheel 26 are said to be staggered, in that the teeth 50 of one sprocket are not in line with the teeth 50 of the other sprocket. The wire 46 is tightly stretch about the outer perimeter of the sprocket 42 as defined by the tips, that is the radially outer portions 52, of the teeth 50. The wire 46 is retained within a small notch (not shown) within the outer tip 52 of each tooth 50. Each roller 48 includes a barrel-shaped middle portion 54 having a truncated conical tip 56 projecting from each end thereof. Through the central axis of the roller 48 is a small bore through which the wire 46 is threaded. That is, the peripheral rollers 48 are "strung" upon the wire 46. In this manner, the wire 46 describes a polygonal shape made up of an endless series of equal chords of the circle defined by the radially outer portions 52 of the teeth of the sprocket 42. Each of these chords provides a relatively rigid axle about which each of the rollers 48 may rotate freely. Note that the length of each roller 48 from tip to tip of the conical portions 56 is just slightly less than the length of each of the chords defined by the wire 46. The small dual wheel 30 are of similar construction to the large dual wheels 26.

Each of the wheels 26 and 30 is a drive means movable relative to the frame 12 to displace the frame relative to the surface 32. The rollers 48 on the periphery of the wheels are anti-friction means for reducing the frictional resistance to motion of the wheels in directions transverse to their respective driving directions.

It will be noted that the radially outer edge of the barrel-shaped middle portion 54 of each roller 48 defines an arc of a circle about the center axis of the sprocket 42. As is best seen in FIG. 1, the combination of two staggered sprockets 42 with endless chains 44, i.e., the large dual wheel 26, when viewed in side elevation, presents a circular outer edge for continuous rolling contact with the surface 32. This is a function of the staggering of the two sprockets 42, and an overlap of the rollers 48 on the two sprockets when one is superimposed upon the other, as is seen in FIG. 1. It will be appreciated that in certain applications where the ultimate precision control of movement is not required, and where the surface to be traversed is relatively smooth as compared to the space between adjacent rollers on a single wheel element, an economical design may dictate that each wheel comprise only a single wheel element rather than the dual wheel elements described above.

The omni-directional transport device 10 provides a simple yet effective mechanism for achieving transport of the device 10 in any direction across the surface 32. Furthermore, as is described below, means are provided for the measurement and subsequent reproduction of such relative motions.

Looking down upon the device as seen in FIG. 3, an arbitrary motion of the transport device 10 can be achieved as follows. Defining the axis of the axle 24 as the X axis and the axis of the axle 28 as the Y axis of a planar surface, any motion of the transport device 10 across the surface 32 can be achieved by a combination of incremental inputs to the motors 34 and 36. If it is desired to move the transport device 10, in a direction parallel to the X axis, a distance equal to, for example, one circumference of the small dual wheels 30, an input to the motor 36 is given to achieve one rotation of the small dual wheels 30. A zero input is given to the motor 34. As the wheels 30 turn about axis of the axle 28, the transport device 10 will be driven in the X direction, that is, parallel to the axle 24, due to the frictional force between the rollers 48 and the surface 32. It will be seen that although the large dual wheels 26 also contact the surface 32, they will provide only a rolling frictional resistance to the movement of the transport device because of the presence of the peripheral rollers 48.

Similarly, if it is desired to transport the device 10 in the Y direction, that is, in the direction parallel to the axle 28, an input is given to the first drive motor 34, thereby rotating the axle 24 and the large dual wheels 26, to drive the device 10 in the Y direction. Similarly, the small dual wheels 30 provide only a rolling resistance to motion in the Y direction because of the presence of the peripheral rollers.

It is then apparent that in order to achieve any arbitrary motion of the transport device 10 relative to the surface 32, it is only necessary to provide the appropriate inputs to both the motors 34 and 36, simultaneously or in sequence, thereby driving each of the axles 24 and 28. The motion of the transport device 10 is then the resultant of the motion which would be achieved by inputs in either the X or Y direction individually.

After a desired arbitrary motion has been accomplished, it is possible to return the transport device 10 to its original location upon the surface 32 by merely providing an input to each of the motors 34 and 36 which is the exact opposite of the initial input. Since all of the motion between the transport device 10 and the surface 32 is achieved by a positive relatively slip-free frictional drive means, the original path of the transport device 10 can be exactly retraced. Also, it will be noted that the transport device 10 can be returned to its original location through a different path by any desired combination of inputs to the motors 34 and 36 so long as the resultant sum of the inputs is the exact opposite of the resultant sum of the original inputs.

It will also be appreciated that the device 10 retains its orientation relative to the surface during these movements. That is, the device 10 will not rotate about a vertical axis. This is due to the fact that opposed wheels, e.g. the two small dual wheels 30, are given identical inputs. As will be explained below, it is possible to achieve rotational motion in a similar embodiment by providing separate drive means for each wheel.

The instrument 40 carried in the aperture 38 can serve a variety of functions. For example, if it is desired to use the transport device 10, as a drafting instrument, i.e., to make drawings upon a sheet of paper, then the instrument 40 would be comprised of a drafting pen adjustable so as to contact the paper which is represented by the surface 32.

It will be noted that the drive motors 34 and 36 could be replaced with or augmented by means for measuring the rotational movement of the axles 24 and 28, to thereby record information representing any motion of the apparatus 10 relative to the surface 32, by whatever means such motion might be induced. Accordingly an input could then be made to the motors 34 and 36 which was the exact opposite of the recorded motion, to retrace exactly the recorded motion, or produce another equivalent path to return the transport device 10 to its original location.

In a similar fashion, the transport device 10 can be held in a fixed position relative to some reference system exterior to both the transport device 10 and the surface 32 so that the surface 32 may be given any desired motion relative to the exterior reference system.

As previously mentioned, an important object of the transport device of the present invention is to provide a device which can move across a relatively smooth surface without incurring any substantial sliding motion between the device and the surface. This is achieved by the use of non-parallel wheels having peripheral rollers. The phrase "relatively smooth surface" is used to indicate a surface whose irregularities are not of such magnitude as to cause the wheels to lose contact with the surface. This, of course, is dependent upon both the design of the wheels and the transport device. The phrase "without incurring any substantial sliding motion" indicates the wheels do not slide over the surface when moved parallel to their axes of rotation, but rather there is only a rolling friction due to the presence of the peripheral rollers.

Referring now to FIG. 5, a second preferred embodiment of the transport device of the present invention is shown and generally designated by the numeral 200. As is seen in the top view of FIG. 6, the transport device 200 includes a rectangular frame 202 having sides 204, 206, 208 and 210. Upon each side is mounted a drive sprocket 212, a return sprocket 214 and idler sprockets 216 and 218. Wrapped about the sprockets 212, 214, 216 and 218 is an endless track 220. The track 220 is comprised of an endless wire 222 upon which is mounted a plurality of spherical rollers 224. The wire 222 is threaded through small bores drilled through a diameter of each of the spherical rollers 224. As is best seen in FIG. 7, each of the sprockets includes a plurality of teeth 226 each of which has a notch 228 within the central portion of its outer extremity. The wire 222 is nested within the notches 228. It will be appreciated that the specific embodiment of the track 220 just described is only a simplified example of such a track. Equivalent tracks suitable for use on a heavy transport device such as a military tank would use the same essential element of an endless series of rollers, but would necessarily be of a much more rugged construction.

It will be seen that each of the sprockets only partially engages the endless track 220. Along those portions of each sprocket which are engaged with the endless track 220 it is seen that one of the rollers 224 fits within the space between adjacent teeth 226.

A driving input to each of the endless tracks is achieved through the driving sprocket 212. The driving sprockets adjacent the sides 204, 206, 208 and 210 are powered by drive motors 230, 232, 234 and 236 respectively. Power is transmitted from the drive sprockets 212 to the endless track 220 by means of the teeth 226 which bear upon the rollers 224. As the drive sprocket 212 is rotated it pulls the endless track 220 about its outer circumference. The endless track 220 is then forced into intimate contact with a surface 238 by means of the idler sprockets 216 and 218. The location of the idler sprockets 216 and 218 relative to the surface 238 is such that each of the beads 224 is forced into intimate contact with the surface 238 as it passes between the surface 238 and either of the idler sprockets.

The endless track 220 then wraps around the return sprocket 214 and returns to the drive sprocket 212.

Note that each of the four endless tracks 220 of the transport device 200 operate independent one of the other. This is in contrast to the transport device 10 previously described in which opposing wheels were rigidly attached to a common axle. It will be appreciated that each of the tracks 220 of the transport device 200 is the functional equivalent of one of the wheels 26 or 30 of the transport device 10. Much greater versatility of a transport device is achieved by use of four separate drive motors as is shown in the transport device 200. The use of separate drive motors upon each of the four tracks permits the transport device 200 to perform rotational movements in place. This feature is not however essential or peculiar to this particular embodiment of the transport device of the present invention. Any of the embodiments can be provided with individual drive means on each wheel or with solid axles between pairs of wheels depending on the particular application. It is possible to rotate the transport device 200 about a central vertical axis defined by the intersection of imaginary diagonals drawn from corner to corner of the frame 202. All that is necessary is to give equivalent inputs to each of the drive motors in such a direction that the motions of each endless track propel the transport device 10 all in the same rotational direction, for example, counter-clockwise, as seen in FIG. 6, about the central vertical axis of the frame 202. Also, due to this zero length turning radius, the transport device 200 can achieve pivotal movements about any point upon the surface 238.

Furthermore, as described above in reference to the transport device 10, the transport device 200 can also be supplied with apparatus for measuring the rotational movement of each of the drive sprockets 212, so that the motion of the transport device can be recorded and then repeated or reversed as desired. Additionally it will be seen that the transport device 200 could be held at a fixed location relative to an external reference system and used to move a surface 32 relative to the external reference system.

Referring now to FIG. 8, a third preferred embodiment of the transport device of the present invention is shown and generally designated by the numeral 300. The transport device 300 includes a rectangular parallel piped frame designated by the numeral 302 which includes four vertical sides 304, 306, 308 and 310. Attached to the frame 302 is a first drive motor 312 and a second drive motor 314. The first drive motor 312 drives an axle 316 by means of conventional gearing (not shown). The second drive motor 314 drives a second axle 318 also by means of conventional gearing (not shown).

Mounted upon either end of the first axle 316 is a large dual wheel 320. Mounted upon either end of the axle 318 is a small dual wheel 322. It will be noted that the construction of the transport device 300 is similar to that of the transport device 10, shown and described with relation to FIG. 1 above, except for the design of the dual wheels.

Referring now to FIG. 9, an enlarged side elevational view of a large dual wheel 320 is shown. The dual wheel 320 is comprised of a first wheel frame 324 and a second wheel frame 326 (shown in dashed lines). The first wheel frame 324 is comprised of two U-shaped bracket members 328 which are attached one to the other in a back-to-back fashion. That is, a central portion 330 of each bracket member 328 is located adjacent the corresponding central portion 330 of the other bracket member 328. Along the middle portion of each central member 330 of each bracket member 328 is a semi-circular indentation 332, the combination of which pair of semi-circular indentations comprises a circular bore into which the axle 316 is snuggly fitted. Each U-shaped bracket member 328 also includes a pair of end portions 334. Also attached to each end of the axle 316 is the second wheel frame 326 constructed in a similar manner to the first wheel frame 324, and having U-shaped bracket members 338 located such that middle portions 340 of the U-shaped members 338 of the second wheel frame 326 are located perpendicular to the middle portions 330 of the first wheel frame 324.

Located between the end portions 334 of each of the bracket members 328, and between end portions 342 of each of the bracket members 338 are rollers 344. Each wheel frame 324 and 326 and their respective rollers 344, is referred to as a single wheel element. As is seen in FIG. 9, the radially outer portion of the rollers 344 each comprise an arc of a circle defining the radially outer portion of the wheel 320, and the arc defined by each roller is one-fourth the circumference of the wheel 320. In this manner as the wheel 320 revolves about the axle 316 there is at all times a portion of one of the rollers 344 in contact with the surface upon which the wheel is rolling.

The wheel 320 can be so constructed that the arc portions of the rollers 344 each describe an angle of greater than 90° such that they overlap. It is desirable that each roller 344 describe an arc of at least 90° so that the four rollers combined will define a complete circle.

The small dual wheels 322 are constructed in a manner similar to the large dual wheels 320.

Motion of the transport device 300 is achieved and controlled in the same manner as was motion of the transport device 10 as shown and described in relation to FIG. 1 above. A more versatile motion of the transport device 300 can be achieved by replacing the axles 316 and 318 with four individual axles, one for each wheel, and with independent drive motors for each axle, in which case the wheels 320 and 322 can be of the same size, and then rotational and pivotal motions similar to those described above for the transport device 200 can be achieved.

Referring now to FIG. 10 a fourth preferred embodiment of the omni-directional transport device of the present invention is shown and generally designated by the numeral 400. The transport device 400 includes a first upper U-shaped frame member 402 and a second lower U-shaped frame member 404. The upper frame member 402 includes a center portion 406 substantially parallel and end portions 408 and 410. The lower frame member 404 includes a center portion 412 and end portions 414 and 416. Mounted upon each of the vertical sides or end portions 408, 410, 414 and 416 of the frame members 402 and 404 is a pair of truncated spherical rollers designated by the numerals 418 and 420. Each of the rollers 418 and 420 is rotatably mounted upon its respective end portion so that it is rotatably driven by a drive gear 422, so as to rotate about an axis normal (substantially perpendicular) to its respective end portion. Additionally, each of the truncated spherical rollers 418 and 420 is mounted by means of a roller axle 423 within a yoke 424 which is attached to the drive gear 422, so that each of the rollers 418 and 420 is free to rotate about an axis of rotation transverse to the axis of rotation of the yoke 424. The combination of the yoke 424 and the respective roller 418 or 420 is referred to as a roller drive assembly. The truncated spherical rollers 418 and 420 which are attached to the upper frame member 402 are driven by a conventional drive motor and gearing system 425 through an axle 426 to each end of which is attached an upper power gear 428 which accordingly engages and drives the drive gears 422 so as to rotate the roller drive assemblies.

The pair of roller drive assemblies attached to each end 408 and 410 of the first upper frame member 402 drive the transport device 400 in a first direction parallel to the ends 408 and 410, and the roller drive assemblies attached to each end 414 and 416 of the second lower frame member 404 drive the transport device 400 in a second direction parallel to the ends 414 and 416. Each of said roller drive assemblies of said first upper frame member 402 includes a means for providing a rotating driving force to rotate the roller drive assembly about an axis of rotation transverse to said first direction. This means for providing a rotating driving force includes the yoke 424 mounted to rotate about an axis transverse to said first direction and the associated gears 422, 428 and drive motor system 425. Each of said roller drive assemblies of said first upper frame member 402 also includes a means for allowing free rotation of the roller 418 or 420 about an axis transverse to the axis of rotation of its respective yoke 424. The roller drive assemblies of the second frame member 404 are similarly constructed to provide a driving force in the second direction. Each of the rollers 418 and 420 of each end of each frame portion freely rotate with their respective yokes 424 about axes transverse to each other. That is the axis of rotation of roller 418 is transverse to the axis of rotation of roller 420.

Similarly, the rollers 418 and 420 attached to the lower frame member 404 are driven by a conventional drive motor and gearing system 430 by means of an axle 432 and lower power gears 434 attached to each end thereof and engaging the drive gears 422. It will be appreciated that the pair of roller drive assemblies attached to each side of the transport device 400 is the functional equivalent of a wheel with peripheral rollers. Furthermore, it is noted that more than two truncated spherical rollers could be mounted on each side of the transport device 400.

The upper frame member 402 and the lower frame member 404 are flexibly connected by means of resilient spring members 436 attached to the inner surfaces of the upper and lower frame members, and by a stabilizing link (not shown) between the frame members 402 and 404.

Note that FIG. 10 shows that opposing truncated spherical rollers, e.g., roller 418 of side 410 and roller 420 of side 408, are oriented with their respective roller axles 423 transverse to each other. With this orientation the contact points of the rollers which at any given time are in contact with the surface define the corners of a rectangle. If, however, opposing rollers are oriented with their respective roller axles 423 parallel to each other a somewhat different contact point pattern, i.e., a truncated isoceles triangle, is produced. This second contact pattern provides for more stable locomotion of the transport device 400 upon irregular surfaces.

Referring now to FIG. 11, an enlarged partly cross-sectional view of one of the roller drive assemblies and its drive mechanism is shown. As is seen in FIG. 11, the drive gear 422 is rigidly attached to a take-off gear 438 located adjacent the inner vertical surface of the frame end portions upon which the drive assembly is mounted. The drive gear 422 and the take-off gear 438 are connected by means of a take-off axle 440 located within conventional bearings 442. The take-off gear 438 drives a conventional rotation recording means 446, which is described in more detail below, to record the motions of the transport device 400. The recording means 446 is driven by means of a recorder drive gear 448 engaging the take-off gear 438 and attached to a recorder drive shaft 450.

It will be noted that any of the rollers, when viewed from a direction perpendicular to the frame end portion upon which the roller is mounted, will appear to be a double truncated circle, about the axis of rotation of the yoke 424. Each of the non-truncated portions of the circle thereby defines an arc of the circumference of the circle. Additionally note that for each pair of truncated spherical rollers 418 and 420 the roller axle 423 of the roller 418 must be perpendicular to the roller axle 423 of the roller 420. In this manner there is at all times a portion of one of each pair of rollers 418 and 420 in contact with the surface upon which the transport device 400 is located.

It will be noted that the flexible connection between the upper frame member 402 and the lower frame member 404 which is achieved by means of the springs 436 allows those frame members to move relative to each other and provides an apparatus which can traverse irregular surfaces without causing any one of the four pairs of rollers to lose contact with the surface. As discussed above, the additional use of parallel orientation of the roller axles of opposing rollers can provide even further stability to a device for traversing irregular surfaces.

All of the preferred embodiments of the present invention described above have shown various means for providing wheels having peripheral rollers, and rotating about non-parallel axes or for providing pairs of roller drive assemblies rotating about non-parallel axes. In fact, each of the above embodiments has shown four wheels with peripheral rollers (or pairs of roller drive assemblies as is the case in FIG. 10), two of which are attached to one axle (or to a pair of parallel axles), and the other two of which are attached to a second axle (or a second pair of parallel axles) which is perpendicular to the first axle (or pair of parallel axles). It is not, however, necessary that such a configuration be used to achieve the ends and purposes of the present invention. All that is required is that the omni-directional transport device have two wheels, rotating upon axes which are not parallel one to the other, and that each wheel have peripheral rollers. In this manner, controlled inputs to each of the two wheels can be combined to achieve any resultant in a given XY plane, or upon a non-planar surface. Additionally, the apparatus can be provided with more than two wheels.

Referring now to FIGS. 12A, 12B and 12C, various other possible combinations and orientations of the wheels or pairs of roller drive assemblies are shown. FIG. 12C shows an orientation of four wheels each mounted upon axles spaced 90° apart, similar to the several embodiments discussed above. FIG. 12A shows a transport device having three wheels mounted upon axles within a plane and at angles of 120° one to the other. FIG. 12B shows a transport device having three wheels mounted upon axles within a plane and at angles of 90° one to the other with a gap of 180°. There is an infinite possible number of combinations of the number of wheels and orientations of their corresponding axes.

Referring now to FIG. 13A, a fifth embodiment of the transport device of the present invention is shown and generally designated by the numeral 500. The transport device 500 is designed to provide or record omni-directional movement upon the outer surface of a cylinder 502. The transport device 500 includes a frame 503 having three wheels 504, 506 and 508 attached thereto. The wheels 504 and 508 are located so as to rotate about an axis parallel to the longitudinal axis of the cylinder 502. The wheel 506 is located so as to rotate about an axis transverse to the longitudinal axis of the cylindrical member 502. Each of the wheels 504, 506 and 508 is a wheel having peripheral rollers (not shown) and may be constructed in any of the several manners previously described for such wheels. It will be appreciated that transportation of the device 500 to any point upon the surface of the cylinder 502 can be achieved as follows. Longitudinal movement parallel to the axis of the cylinder 502 is achieved by rotation of the wheel 506. Rotational movement of the transport device 500 through an angle about the axis of the cylinder 502 is achieved by rotation of the wheels 504 and 508. By an appropriate combination of rotations of the wheels 504 and 508 and the wheel 506, the transport device 500 can be moved at any orientation to any point upon the surface of the cylinder 502. Note that the wheels 504, 506 and 508 are positioned so as to contact the surface of the cylinder 502 at points such that the arc of a circumference of the cylindrical surface between the contact point of at least one of the wheels, i.e., wheel 506, and the contact points of the other two wheels, is greater than one quarter of a circle.

A slightly altered embodiment of the transport device 500 is shown in FIG. 13B and generally designated by the numeral 550. The transport device 550 is also designed so as to provide omni-directional movement about the outer surface of a cylinder 502. The transport device 550 includes three wheels 552, 554 and 556 mounted upon a frame 558. Each of the wheels 552, 554 and 556 is a wheel with peripheral rollers (not shown). The wheels 552 and 554 are located so as to rotate about axes transverse to the longitudinal axis of the cylinder 502. The wheel 556 is located so as to rotate about an axis parallel to the longitudinal axis of the cylinder 502. In this manner, the transport device 550 can achieve motion identical to that of the transport device 500 by similar rotation of the wheels 552, 554 and 556.

Referring now to FIG. 13C, a sixth preferred embodiment of the transport device of the present invention is shown and generally designated by the numeral 600. The transport device 600 is so constructed as to provide for omni-directional transportation about the inner cylindrical surface 602 of a hollow cylinder 602. The transport device 600 includes a frame 603 upon which are mounted three wheels, having peripheral rollers (not shown). A first wheel 604 is located so as to rotate about an axis transverse to the longitudinal axis of the cylinder 602. The other two wheels 606 (only one of which is visible) are located so as to rotate about axes parallel to the longitudinal axis of the cylinder 602. In a manner similar to that described above for the transport device 500, the transport device 600 can be transported to any point upon the inner cylindrical surface of the cylinder 602. Note that the wheels are positioned so that the points of contact of the two wheels 606, which have parallel axes of rotation, with the inner surface of the hollow cylinder 602, are 180° opposed to the point of contact of the remaining wheel, 604, with the inner cylindrical surface.

In all three of the embodiments shown in FIGS. 13A–13C, positive contact between the wheels and the surface is provided by resilient means forcibly urging the wheels against the surface. Such resilient means can be provided by constructing the frame so that it acts as a spring or by providing additional spring means between the frame and the wheels. It is further understood that each of the wheels can be provided with drive means and/or recording means as previously described.

Referring now to FIG. 14, a transport device 700 for omni-directional motion upon an outer surface of a sphere 702 is shown. The transport device 700 is seen to be of a similar construction to the transport device 10 shown and described above in relation to FIG. 1, with the exception that the transport device 700 has single wheels rather than dual wheels. The transport device 700 can be constructed in any one of the forms already described above. Additionally, the transport device 700 can be held at a fixed location relative to an external reference system and the sphere 702 then rotated relative to the external reference system. Also, the device 700 can be used to provide motion relative to the inner surface of a hollow sphere.

The transport device 700 may also be used as a transmission member for transferring rotational motion from the sphere 702 to a second surface (not shown). As viewed in FIG. 14, the second surface would engage the transport device (transmission member) 700 from the front from above. The second surface could be planar, or another sphere, or a cylinder as shown in FIG. 15, or a myriad of other configurations. The transport device (transmission member) 700 is shown as having four wheels mounted upon a frame so as to rotate about axes spaced 90° one from the other within a plane normal to an imaginary line connecting the closest points of the sphere and the second surface. It could, however, have as few as three, or more than four wheels. It is necessary that the transport device (transmission member) 700 have at least three wheels, the axis of rotation of at least one of the wheels being positioned so as to form an angle of at least 90° at its intersection with the axis of rotation of each of at least two of the other wheels, to provide for stable positioning of the transport device 700 relative to the sphere 702.

Each wheel is positioned so as to contact the sphere 702 at a point on the periphery of the wheel, and to contact the second surface at another point on the periphery of the wheel. In this way, the rotational motion of the sphere is transferred to the second surface through the wheels, in the same manner as a disk shaped transmission gear will transfer rotational motion from one disk shaped gear to another.

Referring now to FIG. 15, a transport device 800, so constructed as to provide for omni-directional transportation of a cylindrical object 802 relative thereto is shown. The transport device 800 is comprised of a frame 804, having four wheels 806, 808, 810 and 812 rotatably mounted thereon about axes spaced 90° one from the other within a plane parallel to the longitudinal axis of the cylinder 802. One pair of adjacent wheels, i.e., the wheels 806 and 808, are positioned so that the shortest distance between them is less than the diameter of the cylindrical object 802. The other pair of adjacent wheels, i.e., the wheels 810 and 812, are similarly positioned so that the cylinder 802 may be cradled between adjacent wheels.

If equal and opposite rotational inputs are given to a pair of adjacent wheels, the cylinder 802 will be transported in a direction parallel to its longitudinal axis, but no rotational motion will be caused. By the term "opposite rotational inputs" it is meant that the direction of rotational motion of one wheel, when viewed from the frame 804, is clockwise, and the direction of rotational motion of the adjacent wheel when so viewed is counter-clockwise. Any relative rotations of a pair of adjacent wheels which are not equal and opposite, will impart a rotational motion to the cylinder 802. By an appropriate combination of rotations of all of the four wheels, any desired motion of the cylinder 802 relative to the transport device 800 can be achieved.

It will be understood that the transport device 800 could be used to provide similar motion of other approximately cylindrical object such as a conical member or a longitudinal member of oval cross-section.

Incremental Drive Means and Rotational Measurement Means

It will be appreciated by those skilled in the art that the incremental drive means and motion detection means used with the transport device of the present invention can be comprised of any one of numerous such drive means and detection means which are well known to the prior art. One particular applicable combination of drive means and measuring means is the following.

As is well known in the prior art, closely controlled incremental motion drive means is easily and economically achieved by means of stepping motors, which are electro-mechanical devices which, when electrically energized, move through a discrete rotational distance. For example, such stepping motors can be designed to move through 180°, 90° or any other discrete angle upon a single input pulse.

It is then apparent that the use of a conventional stepping motor drive means is well suited to use in the transport device of the present invention along with conventional electro-mechanical rotational detection means. Additionally, an intermediate computer logic circuit, with appropriate interface means between it and both the drive means and measurement means, for storage of the output from the rotational measurement means and subsequent conversion of that signal to a suitable incremental pulse input for the drive means is necessary.

A particularly suitable rotational detection means is a conventional rotary commutator and brush, by means of which an incremental electrical output is generated by rotary movement of the brush relative to the commutator. The commutator and brush can be designed to provide any number of discrete signals to represent a single revolution of the measured movement as will be understood by those skilled in the art.

For example, in the transport device 10, of FIG. 1, a separate rotational measurement means can be attached to each of the axles 24 and 28. Then upon motion of the transport device 10, the output signals generated can be stored in the computer. If it is then desired to retrace the path originally traversed, the computer is merely instructed to give the drive means 34 and 36 appropriate inputs which would be the reverse of the inputs required to traverse the original path.

It will be appreciated that such detection means, computer means, and drive means, in combination with the transport device 10 have particularly useful applications. For example, it is not necessary to program the transport device to perform a desired function, but rather the function can be "taught" to the transport device. This is done by merely using some external force to originally propel the transport device through the desired path. This motion is measured and stored, as previously described, and then the transport device has the capability of reversing or repeating that motion without further external assistance.

A simple application of such a procedure would be to "teach" a floor sweeping machine, mounted upon the transport device 10, to sweep the aisles of a department store. The machine could be hand propelled through the desired path the first time, and then could repeat the procedure on its own. An additional technique which could be included in this procedure is the periodic "standardization" of the machine's location. For example, the machine would be started from a fixed location, e.g., a corner, when it was initially "taught" its prescribed path for sweeping the floors of the store. All motion then would be measured relative to that initial reference point. Inevitably as the transport device proceeds with its nightly duties, small errors will build up due to errors in output measured and input produced. If such errors were permitted to build up to an excessive extent, the transport device would deviate unacceptably from its desired path. To prevent this, the transport device is periodically sent back into the corner so that it can regain its bearings.

Practical Applications

It will be appreciated by those skilled in the art that there are a multitude of practical applications of the various embodiments of the transport device described above.

The various embodiments of an omni-directional transport device as shown in FIGS. 1–12C for movement relative to a planar or slightly irregular surface can be used to provide means for carrying an instrument such as a drafting pen across a piece of paper to inscribe marks upon the paper. Such apparatus could also be used to provide improved means of locomotion of devices such as wheel chairs and forklifts which require a short turning radius, or to improve their operation. As described above, the omni-directional transport device of the present invention can be constructed so as to allow for rotation about the central axis of the device or pivotation about any point upon the surface. Such movements are induced by supplying the proper rotations to each of the wheels of the device as described above.

Another important use of the omni-directional transport device described above would include military applications such as the provision of an automated tank or other weapon carrying system which could be transported through any desired location upon a terrestrial surface and then returned to its origin by means of supplying inputs exactly the reverse of the inputs required to cause the original locomotion of the device. The advantage of the present device over an automated military apparatus using conventional drive means is that so long as the surface traversed is such that the wheels of the omni-directional transport device remain in contact with the surface, then no slippage of the wheels relative to the surface will occur because of the peripheral rollers of the present invention. This permits the original journey of the device to be recorded and then repeated or reversed. In a conventional tank with two parallel endless tracks, such would not be possible because it is necessary for one or the other or both of the two parallel tracks to slip relative to the surface being traversed when the tank makes any motion in a direction not parallel to the tracks themselves. For that reason, a conventional tank could not be so easily constructed to retrace a general non-linear path because it would be very difficult to record and duplicate the slippage of the device relative to the surface being traversed.

Referring to the device of FIGS. 13A and 13B and the device of FIG. 15, it will be apparent that there are many applications of this device in such fields as the welding and fabrication of pipe and other relatively cylindrical objects. For example, either of these apparatus could be used in conjunction with an automatically controlled cutting device such as a torch to provide means for cutting and beveling of steel pipe in preparation for fabrication of the same. Also, these same apparatus could be used in conjunction with automatically controlled welding means to provide a computer controlled welding machine for the fabrication of pipe. It will be readily apparent to those skilled in the art that these apparatus could be combined with a suitably programmed computer, and control means for the cutting device, to create any desired cut upon the pipe. For example, it might be desired to cut the pipe at some angle relative to its longitudinal axis and to provide a varying bevel around the perimeter of this cut. Such is easily provided by the transport device of the present invention by merely providing the appropriate inputs to the wheels of the device.

Another example of a useful application of these apparatus would be the welding of spiral welded pipe, i.e., pipe made from flat steel plate by spiraling a long portion of the plate upon itself and welding the plate together at the seams. This could be accomplished either by carrying a welding maching upon the transport device and rotating that combination relative to the pipe or by using the transport device to rotate the pipe and holding both the transport device and the welding means fixed relative to each other and to some other reference system.

The device of FIG. 13C has many useful applications where it is necessary to transport anything within a hollow cylinder such as a pipe. For example, the transport device 600 could be used to carry apparatus through a pipeline to check the pipeline for faults, or to make repairs.

Thus, the omni-directional transport device of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An omnidirectional transport device comprising:
   a frame;
   a first plurality of roller drive assemblies, rotatingly mounted upon the frame;

a second plurality of roller drive assemblies, rotatingly mounted upon the frame and positioned to rotate about axes non-parallel to the axes of rotation of the first plurality of roller drive assemblies; and wherein each of said roller drive assemblies comprises:
a yoke, rotatably mounted upon the transport device; and
a spherical roller, rotatably mounted within the yoke upon axle means having an axis of rotation transverse to the axis of rotation of the yoke, said spherical roller defining two arcs of a circle about the axis of rotation of the yoke, so constructed that at least one roller of each plurality of roller assemblies is always in contact with a surface of which is to be traversed.

2. The device of claim 1, wherein said frame comprises:
a first frame member, having an end portion, said first plurality of roller drive assemblies being mounted on said end portion of said first frame member; and
a second frame member, having an end portion, said second plurality of roller drive assemblies being mounted on said end portion of said second frame member.

3. The device of claim 2, wherein said frame further comprises a resilient member attached to said first and second frame members so that said first frame member may move relative to said second frame member to allow said transport device to traverse an irregular surface while maintaining each of said wheels with peripheral rollers in contact with said surface.

4. The device of claim 1 further comprising:
a first power drive means for powering the first plurality of roller drive assemblies; and
a second power drive means for powering the second plurality of roller drive assemblies, so that movement of the omni-directional transport device to any location relative to a surface may be achieved by the combination of the rotational movements of the two pluralities of roller drive assemblies.

5. The device of claim 1 further comprising means for measuring the rotational motions of said pluralities of roller drive assemblies.

6. The device of claim 1, further comprising:
a third plurality of roller drive assemblies; rotatingly mounted upon the frame and positioned to rotate about axes non-parallel to the axes of rotation of said first and second pluralities of roller drive assemblies.

7. In a transport device for traversing a surface, the improvement comprising a plurality of roller drive assemblies, each roller drive assembly comprising:
a yoke, rotatably mounted upon the transport device, rotation of said yoke driving said device relative to said surface, and
a spherical roller, rotatably mounted within the yoke upon axle means having an axis of rotation transverse to the axis of rotation of the yoke, said spherical roller being truncated at each end of its axle means, the non-truncated portion of the spherical roller defining two arcs of a circle about the axis of rotation of the yoke, so constructed that at least one roller of each plurality of roller drive assemblies is always in contact with said surface which is to be traversed.

8. An omni-directional transport device comprising:
a frame, having first and second substantially parallel ends and third and fourth substantially parallel ends, said first and second ends being transverse to said third and fourth ends; and
a plurality of roller drive assemblies attached to each of said four ends, each of said roller drive assemblies having a yoke mounted upon its respective frame end and a spherical roller rotatably mounted within said yoke, said yoke being rotatable about an axis substantially perpendicular to its respective frame end;
wherein said spherical roller of each of said roller drive assemblies is rotatably mounted within said yoke upon axle means having an axis of rotation transverse to the axis of rotation of the yoke; and
wherein said spherical roller of each of said roller drive assemblies is truncated at each end of its axle means, the non-truncated portion of the spherical roller defining two arcs of a circle about the axis of rotation of the yoke, so that at least one roller of each plurality of roller drive assemblies is always in contact with a surface which is to be traversed.

9. In a transport device for traversing a surface, the improvement comprising a plurality of roller drive assemblies, each roller drive assembly comprising:
support means, rotatably mounted upon the transport device rotation of said support means driving said device relative to said surface;
a spherical roller, rotatably mounted within the support means upon axle means having an axis of rotation transverse to the axis of rotation of the support means, said spherical roller being truncated at each end of its axle means, the non-truncated portion of said spherical roller defining two arcs of a circle about the axis of rotation of the support means, so constructed that at least one roller of each plurality of roller drive assemblies is always in contact with said surface which is to be traversed.

* * * * *

UNITED STATES PATENT OFFICE
CERTIFICATE OF CORRECTION

Patent No. 4,223,753  Dated September 23, 1980

Inventor(s) Harold M. Bradbury

It is certified that error appears in the above-identified patent and that said Letters Patent are hereby corrected as shown below:

Column 2, line 17, delete "relative" and insert --relatively--. Column 9, line 53, after "406" insert --and--. Column 9, line 54, delete "and", first occurrence. Claim 1, line 17 between "roller" and "defining" insert --being truncated at each end of its axle means, the non-truncated portion of the spherical roller--. Claim 3, lines 6 and 7, the language "wheels with peripheral rollers" should be deleted and the language --pluralities of roller drive assemblies-- should be inserted therefor.

Signed and Sealed this

Thirteenth Day of January 1981

[SEAL]

Attest:

SIDNEY A. DIAMOND

Attesting Officer  Commissioner of Patents and Trademarks